United States Patent
Sathyamoorthy et al.

(10) Patent No.: US 10,740,222 B2
(45) Date of Patent: Aug. 11, 2020

(54) INTELLIGENT UNITIZER TEST PLUG-IN

(71) Applicant: SAP SE, Walldorf (DE)

(72) Inventors: Krishnamoorthy Sathyamoorthy, Bangalore (IN); Sriharsha Venkata Teegavarapu, Bangalore (IN); Vivek Dwivedi, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/168,137

(22) Filed: Oct. 23, 2018

(65) Prior Publication Data

US 2020/0125480 A1  Apr. 23, 2020

(51) Int. Cl.
*G06F 9/44* (2018.01)
*G06F 11/36* (2006.01)

(52) U.S. Cl.
CPC ...... *G06F 11/3664* (2013.01); *G06F 11/3684* (2013.01); *G06F 11/3688* (2013.01); *G06F 11/3692* (2013.01)

(58) Field of Classification Search
CPC ............. G06F 11/3664; G06F 11/3684; G06F 11/3692; G06F 11/3688
See application file for complete search history.

(56) References Cited

U.S. PATENT DOCUMENTS

| | | | | |
|---|---|---|---|---|
| 8,806,450 B1* | 8/2014 | Maharana | ........... | G06F 11/3688 717/133 |
| 9,043,759 B1* | 5/2015 | Lininger | ............. | G06F 11/3684 717/106 |
| 9,058,424 B1* | 6/2015 | Bienkowski | ........ | G06F 11/3684 |
| 9,280,442 B1* | 3/2016 | Nicolo | ................ | G06F 11/3604 |
| 10,572,375 B1* | 2/2020 | Wagner | ................... | G06F 9/547 |
| 2004/0133880 A1* | 7/2004 | Paternostro | ......... | G06F 11/3688 717/124 |
| 2005/0125776 A1* | 6/2005 | Kothari | .............. | G06F 11/3672 717/131 |
| 2006/0130040 A1* | 6/2006 | Subramanian | ........... | G06F 8/65 717/168 |
| 2008/0256517 A1* | 10/2008 | Atkin | .................. | G06F 11/3688 717/124 |
| 2008/0307264 A1* | 12/2008 | de Halleux | ......... | G06F 11/3688 714/38.1 |
| 2009/0172647 A1* | 7/2009 | Telang | ................ | G06F 11/3664 717/135 |
| 2010/0146489 A1* | 6/2010 | Ortiz | ................... | G06F 11/3664 717/128 |
| 2011/0173591 A1* | 7/2011 | Prasad | ...................... | G06F 8/10 717/126 |
| 2012/0036496 A1* | 2/2012 | Yang | ................... | G06F 9/44526 717/121 |

(Continued)

*Primary Examiner* — Adam Lee
(74) *Attorney, Agent, or Firm* — Buckley, Maschoff & Talwalkar LLC

(57) ABSTRACT

A system and method for automatically identifying and reporting test units of computer-executable code corresponding to computer-executable code changes within an integrated development environment application so that the code affected by the code changes are tested by the determined test units. The determining of the test units corresponding to the code changes may include determining both direct affectations and indirect affectations to avoid unnecessary testing and an incomplete identification of unit tests.

15 Claims, 9 Drawing Sheets

(56) References Cited

U.S. PATENT DOCUMENTS

| | | | | |
|---|---|---|---|---|
| 2012/0084754 A1* | 4/2012 | Ziegler | ............... | G06F 11/3696 |
| | | | | 717/124 |
| 2012/0222014 A1* | 8/2012 | Peretz | ................. | G06F 11/3684 |
| | | | | 717/125 |
| 2014/0109228 A1* | 4/2014 | Kalman | ................ | G06F 21/577 |
| | | | | 726/25 |
| 2014/0122028 A1* | 5/2014 | Aberg | ................ | G06F 11/3684 |
| | | | | 703/1 |
| 2015/0058675 A1* | 2/2015 | Kadishay | .............. | G06F 11/368 |
| | | | | 714/38.1 |
| 2015/0074645 A1* | 3/2015 | Herrin | ................... | G06F 11/368 |
| | | | | 717/124 |
| 2015/0095619 A1* | 4/2015 | Dubey | ................ | G06F 11/3688 |
| | | | | 712/216 |
| 2015/0355888 A1* | 12/2015 | Shani | ................. | G06F 9/45558 |
| | | | | 717/113 |
| 2016/0041897 A1* | 2/2016 | Carter | ................ | G06F 11/3684 |
| | | | | 714/38.1 |
| 2016/0054983 A1* | 2/2016 | Balasubramanian | ..... | G06F 8/30 |
| | | | | 717/113 |
| 2016/0246709 A1* | 8/2016 | Peck | .................... | G06F 11/3696 |
| 2018/0173613 A1* | 6/2018 | Teitel | ................. | G06F 11/3664 |
| 2018/0314519 A1* | 11/2018 | Lee | ........................... | G06F 8/71 |
| 2019/0004932 A1* | 1/2019 | Misra | ................. | G06F 11/3664 |
| 2019/0138431 A1* | 5/2019 | Holbrook | ............ | G06F 11/3688 |
| 2019/0235999 A1* | 8/2019 | Everitt | ................ | G06F 11/3688 |
| 2019/0317887 A1* | 10/2019 | Wiener | .............. | G06F 11/3664 |
| 2019/0354467 A1* | 11/2019 | Wiener | .............. | G06F 11/3688 |

* cited by examiner

100

```
┌─────────────────────────────────────────────────────────────┐
│  IDENTIFY CHANGES TO A SET OF COMPUTER-EXECUTABLE CODE      │
│                                                         105 │
└─────────────────────────────────────────────────────────────┘
                              │
                              ▼
┌─────────────────────────────────────────────────────────────┐
│  DETERMINE ONE OR MORE TEST UNITS CORRESPONDING TO          │
│           THE IDENTIFIED CODE CHANGES                       │
│                                                         110 │
└─────────────────────────────────────────────────────────────┘
                              │
                              ▼
┌─────────────────────────────────────────────────────────────┐
│  EXECUTE THE ONE OR MORE TEST UNITS CORRESPONDING           │
│              TO THE CODE CHANGES                            │
│                                                         115 │
└─────────────────────────────────────────────────────────────┘
                              │
                              ▼
┌─────────────────────────────────────────────────────────────┐
│  GENERATE TEST RESULTS FOR THE EXECUTED TEST UNITS          │
│                                                         120 │
└─────────────────────────────────────────────────────────────┘
                              │
                              ▼
┌─────────────────────────────────────────────────────────────┐
│  EXPORT THE GENERATED TEST RESULTS TO                       │
│           A REPORTING ENTITY                                │
│                                                         125 │
└─────────────────────────────────────────────────────────────┘
```

INTELLIGENT UNITIZER TEST PLUG-IN

BACKGROUND

According to some software code development practices, guidelines, and standards, software program developers may be expected to run unit tests for the code modified by them to qualify that their modified code passes a first quality level, prior to publishing their code changes for inclusion in a software application. However, there might be hundreds or even thousands of existing unit tests for a particular software product, depending on the size and/or complexity of the product. In this and other scenarios, a program developer might not fully understand which unit tests should be executed to qualify their modified code. For example, an online documentation and/or the personal knowledge of any one or more program developers may be incomplete or imprecise to accurately understand which unit tests should be executed to qualify a given modified code.

As such, a need exists for an efficient and accurate technical framework to automatically identify and report unit tests corresponding to code changes to improve program development standards.

BRIEF DESCRIPTION OF THE DRAWINGS

FIG. 1 is an illustrative flow diagram for a process, according to some example embodiments herein;

DETAILED DESCRIPTION

Figure 2:
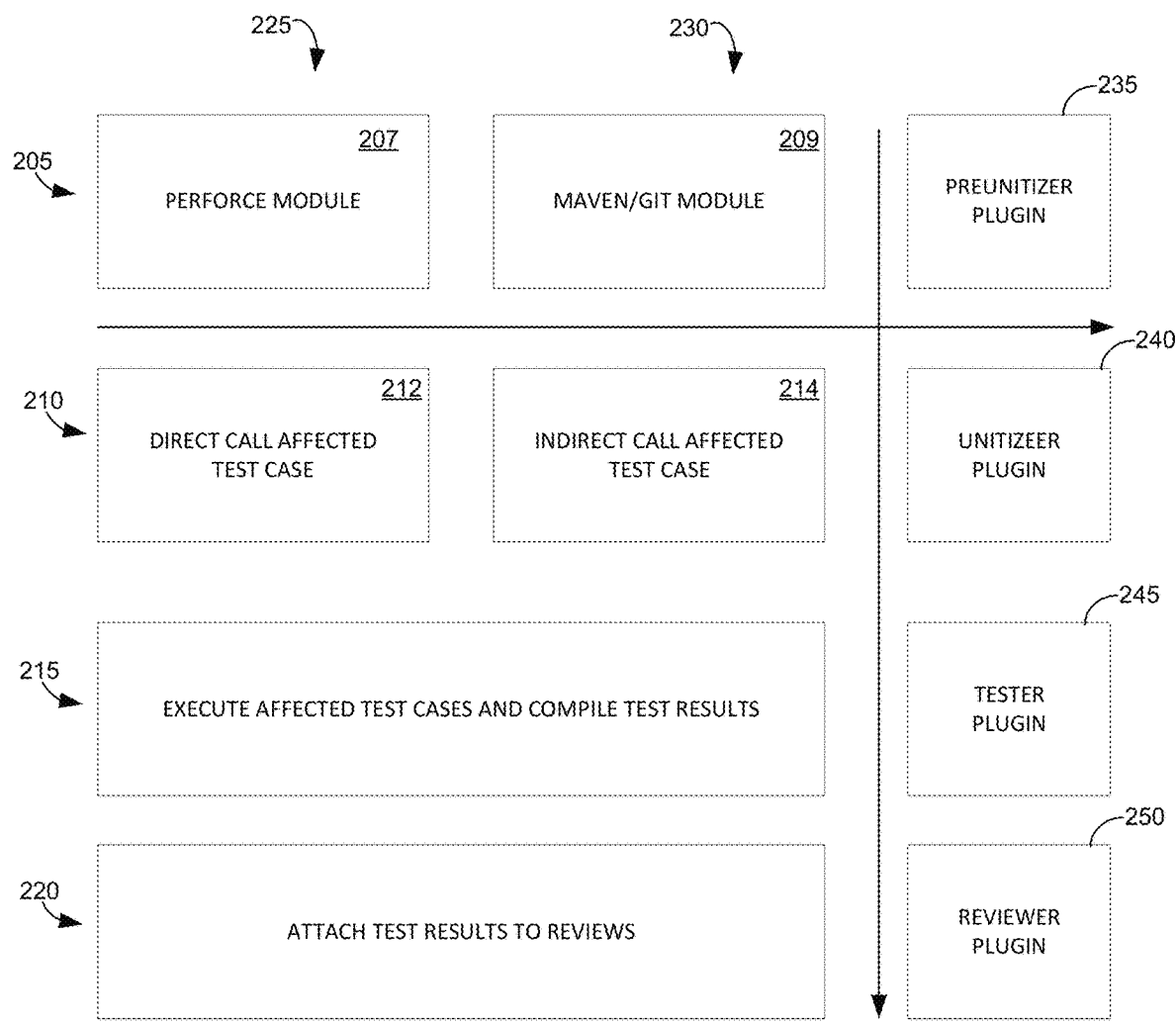
FIG. 2 is schematic diagram of a framework design, for some example embodiments herein.

The following description is provided to enable any person in the art to make and use the described embodiments. Various modifications, however, will remain readily apparent to those in the art.

In some example contexts, use-cases, and embodiments, one or more terms will be used in the present disclosure. As a matter of introduction and to ease the understanding of the present disclosure, a number of terms will be introduced, where the full meaning of the following terms will be further understood in context of the disclosure herein, on the whole.

An integrated development environment (IDE) is a software application comprising multiple different components and functionalities that support and facilitate software developers. An IDE may include a source editor, build automation tools, a debugger, a compiler, and other functionalities. In some instances, various aspects herein might be discussed in the context of one or more different IDEs. However, the aspects and features disclosed herein are not limited to integration or implementation with any specific IDE, unless specifically stated otherwise. As used herein, "version control" refers to a software configuration management component that manages changes to a software program. In some embodiments, changes to a software program or code thereof may be identified by a number, letter, combinations thereof, and other coded identifiers. A version control functionality or system may be implemented as an independent application or it may comprise a component of a software application such as, for example, an IDE. Herein, systems and methods are concerned with identifying and testing modified programming code (also referred to simply as "code"). In some aspects, the code may represent classes (e.g., interfaces) and the systems and methods herein determine the modified classes and the methods thereof. As used herein, the term "modified" generally encompasses the updating, deleting, and addition of code, but broadly relates to any change to code relative to a prior or reference version of the code.

Unit testing is a software testing process in which individual units of code may be tested to determine whether the units of code satisfy specified criteria for use. Unit testing may generally execute a unit of code within a framework distinct from the software product for which the unit of code is created in an effort to isolate the code changes during testing. In some aspects, unit testing may be implemented by parameterized unit tests supported by a testing framework such as, for example, the JUnit testing framework for the programming language Java. The aspects, features, and examples disclosed herein are not limited to the integration or implementation with any specific testing framework (e.g., JUnit, etc.), unless specifically stated otherwise.

FIG. 1 is an illustrative flow diagram of a process 100, in one example herein. Process 100 relates to a framework to effectively and efficiently identify test units affected by changes in code (i.e., code changes) to a set of code such as a software application program, module, or other unit(s) of code. Process 100 further includes features to communicate the identified changes to other entities that might have an interest or stake in the code changes. In some aspects herein, process 100 (and other processes and functions disclosed herein) may be implemented as a stand-alone software module or as a plugin to add functionality to an existing computer program. In some embodiments, process 100 may be implemented as a plugin to add the functionality thereof to an IDE. The Eclipse IDE by the Eclipse Foundation is a widely used IDE and is one example of an IDE to which a plugin incorporating process 100 may be embedded.

In some aspects, process 100 operates to determine changes to a code base or set of code (e.g., an application, module, or other computer-executable software component). In some instances, the code base may be stored in a repository that is accessible to the system or plugin embodying process 100. At operation 105, changes to the set of code may be determined. The code changes may result from developers creating and/or otherwise modifying a software application (e.g., application programming interfaces, etc.) to implement a particular feature or functionality of the application. Code changes or modifications to the code might be indicated by version control identifiers, where for example, modified classes and the methods thereunder, are identified by incremental version control identifiers.

At operation 110, one or more test units corresponding to the code changes identified at operation 105 are determined. In some scenarios, hundreds or even thousands of unit tests might exist for a subject application, where the existing unit tests were written to test the features and dependencies of the application. Accuracy and completeness of task(s) are important at operation 110 in an effort to ensure that the requisite and relevant unit tests are identified (i.e., 100% test coverage for the code changes). It may be neither practical nor efficient to run all of the hundreds or thousands of unit tests for a particular application. Unnecessary and/or incomplete unit tests identification may reduce the efficiency and effectiveness of process 100.

Operation 115 includes executing the one or more unit tests identified as corresponding to the code changes of the present example. The unit tests (e.g., JUnits) may be executed in a manner that isolates the code changes from other aspects of the application for which the code changes are developed to incorporate with. In some embodiments, a user (e.g., a developer or other authorized entity) may be presented, via a graphical user interface, with an opportunity to set, approve, or modify criteria for which of the identified unit tests are executed.

Operation 120 further generates test results for the unit tests executed at operation 115. The test results may be generated and stored in a file record. The generated test results may include an indication of a pass rate and/or whether the executed unit tests evaluated the code changes as passing or failing the criteria and functions tested by the individual unit tests.

At operation 125, the generated test results may be exported to a reporting entity. In some embodiments, the reporting entity may include a software application, plugin, or module that reports and supports a review of the code changes to the subject application. The generated test results may be attached to the review, within a same file or separate file, for further review, reporting, and/or processing. In some aspects, the test result for an executed unit tests is related in the review with an indication (e.g., indicia and/or a spatial relationship between graphic representatives) of the code change(s) corresponding thereto.

In some regards, a number of processing and analysis aspects of process 100 may be accomplished in the background (i.e., unexposed) of an executing application (e.g., IDE). The user might be notified of, for example, the modified code (e.g., methods, etc.), the areas impacted and the corresponding unit tests (e.g., junits), an alert that the user should run the identified unit tests before committing the code, the test results, and a reason for a unit test failure (if determined).

FIG. 2 is an illustrative schematic diagram of a framework design 200, for some example embodiments herein. In the design approach of the example of FIG. 2, there is a logical separation of tasks. In some aspects, there may be a large diversity in the realization of a plugin framework herein. To address aspects thereof, framework 200 is organized into vertical phases 205, 210, 215, and 220 and horizontal modules 225 and 230. In the example of FIG. 2, modules 225 and 230 rely on the vertical phases 205 and 210, but do not apply to the phases 215 and 220. In FIG. 2, a module is defined for an interface with an external repository or to adhere to a particular technology since the framework may be implemented (i.e., realized) in a number of different software environments. For example, module 207 may be configured for interfacing with a Perforce environment provided by Perforce Software and module 209 may be configured to interface with a Maven build automation tool developed by the Apache Software Foundation and/or a Git version control system. The particular version control modules shown in FIG. 2 are examples and are not exhaustive or limiting to the present disclosure. Each of modules 225 and 230 may have a different process for differentiating (i.e., "diffing") a code base to identify the code changes (e.g., modified methods) therein. Each of the horizontal layers, including phases 205, 210, 215, and 220, is handled by its own plugin, 235, 240, 245, and 250 respectively, while each vertical module in a horizontal layer shares a same plugin. The design approach of FIG. 2 provides a mechanism to, in some aspects, group similar functionality in a single plugin while distributing dissimilar functionalities to other, separate plugins. In some aspects, the highly cohesive yet loosely coupled nature of framework 200 may be easily extensible and modified without sacrificing its performance.

While further details of the plugins 235, 240, 245, and 250 will be disclosed in greater detail below, a brief introduction of each in connection with the example FIG. 2 is provided. Preunitizer plugin 235 interfaces with a version control module (e.g., module 207, module 209) to determine what changes have been made to a set of code (i.e., code base) by a user. The changes identified by preunitizer 235 may be transferred to a next phase, the unitizer plugin 240. Unitizer plugin 240 may be tasked to identify test cases affected by the code changes identified by preunitizer plugin 235. In some aspects, the affected test cases identified by unitizer plugin 240 may be delineated into direct call affected test cases that are handled by module 212 and indirect call affected test cases that are handled by module 214. Code changes that are called within a test case directly are processed by the direct call affected test case module 212, while code changes that are called by some other code that is called by a test case are processed by indirect call affected test case module 214.

In some embodiments, unitizer 240 may be responsible for contacting an IDE's internal tools to get additional and/or other meta information about the code changes made and the test cases impacted thereby.

Upon determining the test cases affected by the identified code changes, framework 200 and a process realized thereby may advance to tester plugin 240. Tester plugin 240 may operate to execute the affected test cases and compile test results of the test case executions. The test results from tester plugin 240 may be forwarded to the reviewer plugin 250 for inclusion in a report, visualization, and further processing. In some instances, the reviewer plugin might format and present the test results in a manner (e.g., graphic user interface) such that a user can readily view and understood one or a combination of the code changes made, the test cases affected thereby, and the corresponding test results.

Figure 3:
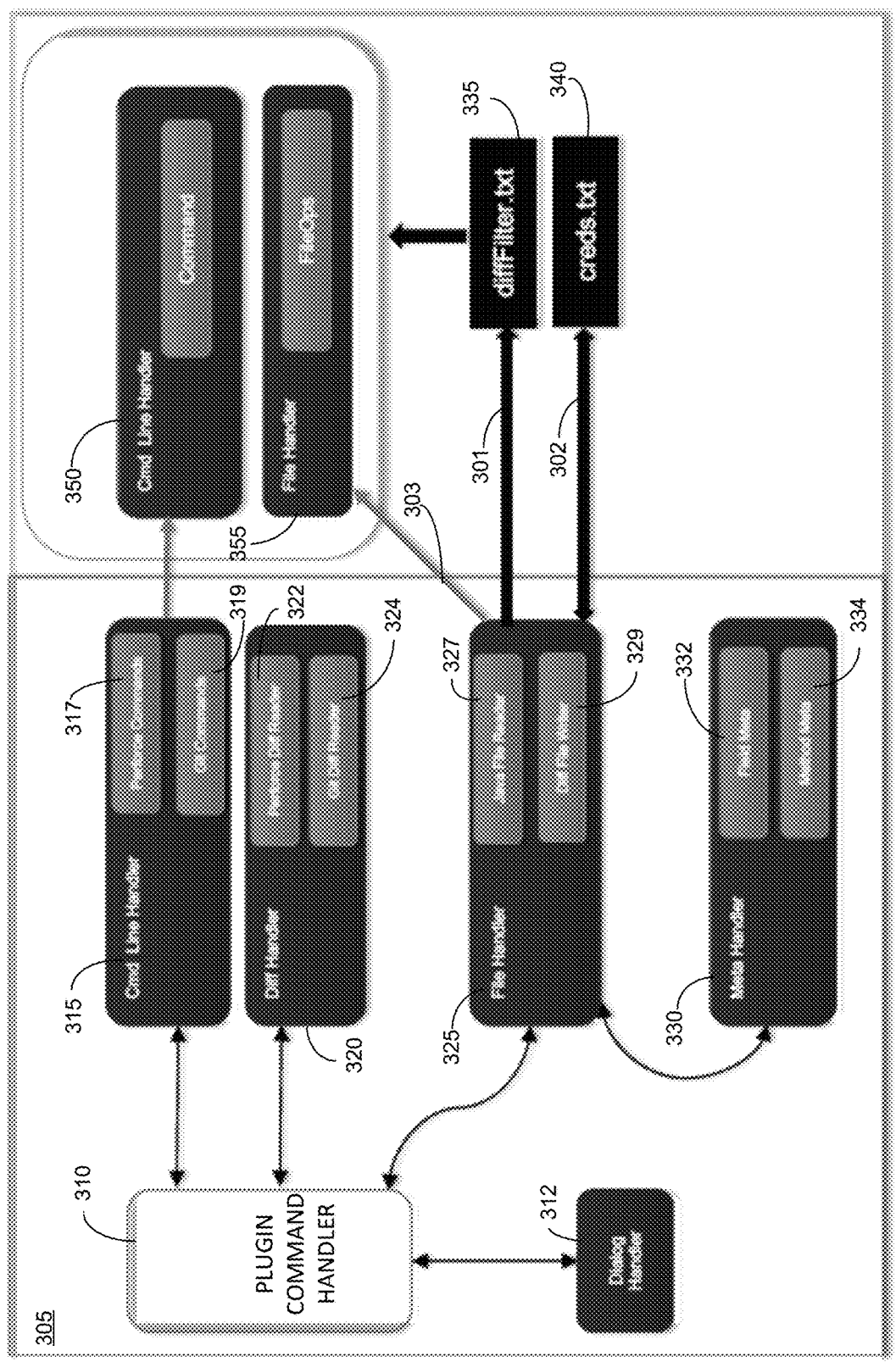
FIG. 3 is an example architecture for a preunitizer, according to some embodiments herein.

FIG. 3 is an example architecture 300 for a preunitizer plugin 305, according to some embodiments herein. In general, architecture 300 depicts the various components that may comprise a preunitizer 305 herein and may be responsible for communicating within version controls to determine the exact code changes made by a user. The major components of preunitizer 305 are shown at, for example, 315, 320, 325, and 330 with their sub-components (e.g., 317, 319, 322, 324, 327, 329, 332, and 334) shown within the major components. Additionally, information and control flow between the components of preunitizer 305 are depicted by the thinner double-headed arrows; the thicker single-headed arrows (e.g., 301, 302) indicate information flow between plugins and external (e.g., text) files 335, 340; and arrow 303 denotes a dependency. Similar conventions are used for other example architectures disclosed herein.

Plugin Command Handler (PCH) 310 is a central handler for preunitizer plugin 305 and synchronizes information transferred between the various components thereof and further communicates information to a unitizer plugin (e.g., unitizer plugin 345). PCH 310 calls on the dialog handler (DH) 312 to receive a changelist number and invokes a command line handler (CLH) 315 to execute command line instructions. PCH 310 obtains the change details from CLH 315 and provides this information to Diff Handler (DH) 320. DH 320 uses one of its diff handler components 322, 324 appropriate for the executing environment to analyze and understand the differences created by the user's code changes. File Handler (FH) 325 operates to combine the determined differences with a file including meta of the code changes made, as well as other meta required or desired for further processing.

DH 312 determines what dialog to display to a user and what kind of input should be provided in reply by a user, as well relaying user inputs to PCH 310. For example, DH 312 might provide an option for a user to specify the type of repository being used to store the code base, wherein the type of additional information (if any) requested from the user depends on the specified repository. DH 312 operates to relay information regarding the repository and other user-supplied meta to PCH 310. In some embodiments, DH 312 may be implemented with a user interface (UI) within an IDE.

CLH 315 provides an interface between a unitizer framework herein and command line/terminal commands to, for example, retrieve the names of modified files (i.e., the code changes) and to retrieve the differences between the changed files. CLH 315 runs command line instructions on a terminal to retrieve code change details from a version control module or system. In some aspects, CLH 315 allows for selecting between repository specific commands. CLH 315 sends data to PCH 310 for further processing. CLH 315 operates to extend a Command Line Handler 350 of unitizer 345. After CLH 315 transfers data regarding the modified files and diff context, it returns the same to PCH 310. Now using this information, PCH 310 calls File Handler (FH) 325 and Diff Handler (DfH) 320. DfH 320 is a mechanism to manage the diff information returned by CLH 315 to PCH 310. DfH 320 is called before a file it is "diffing" is read by Java File Reader 327. DfH 320 reads the diff description and marks to positions of changes for a particular file. In the instance of a deletion, DfH 320 may read the diff description to ascertain whether there have been any field or method deletions and stores meta as well as sending it to PCH 310 for triggering of Java File Reader 327. File Handler (FH) 325 provides a mechanism to read modified Java files for the methods and the fields contained therein, as well as providing a mechanism to communicate an output of the diff operations to a file (e.g., "diffFilter.txt") to be used by a unitizer (e.g., unitizer 345) DfH 320 may in turn invoke Meta Handler (MH) 330 to get data related to Field and Method meta. MH 330 provides a mechanism to store information regarding a field or method such as, for example, a data type/return type, a name, a signature, etc. This meta may be used to identify the method or field being processed by preunitizer 305 and may be further communicated to unitizer 345 for use thereby. Thereafter, PCH 310 may invoke Data File Writer 329 to write the meta to a file (e.g. "difffFilter.txt" 335) and call a unitizer plugin 345 so that the unitizer can determine the affected test cases and generate a report including the results of the affected test cases.

Figure 4:
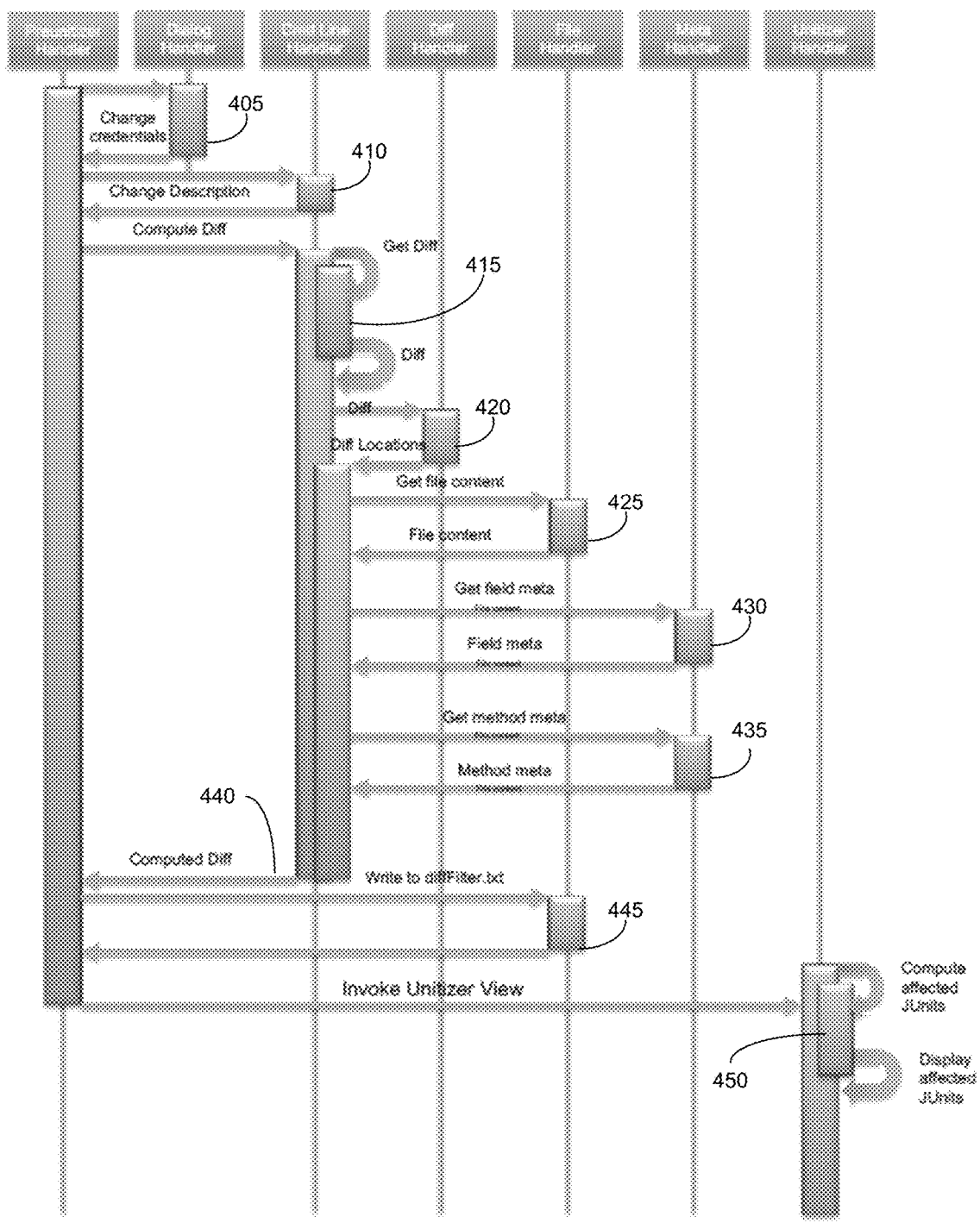
FIG. 4 is an example sequence diagram for a reviewer, according to some embodiments herein

FIG. 4 is an example sequence diagram 400 for a workflow of a preunitizer herein, according to some embodiments. Sequence diagram 400, at least in part, reiterates the workflow described in relation to preunitizer 305 of FIG. 3. At 405, a preunitizer handler receives change credentials from a dialog handler. The command line handler gets a description of the code changes made at 410. The preunitizer handler operates to compute the diffs for individual files that have been changed/modified. The diffs are requested and returned at 415. Further, the locations of the diffs are obtained or otherwise determined at 420 to identify the actual files that have been modified. A meta handler determines the entity type (e.g., field or method) within the modified file by analyzing the file content at 425. The particularly determined entity types field and method are processed at 430 and 435, respectively. The computed diffs are returned to the preunitizer handler at 440 and written to a file by a file handler at 445. The preunitizer handler may further invoke a unitizer view at 450 by a unitizer handler that may in turn compute the affected test cases (i.e., unit tests), as well as display the affected test cases.

Figure 5:
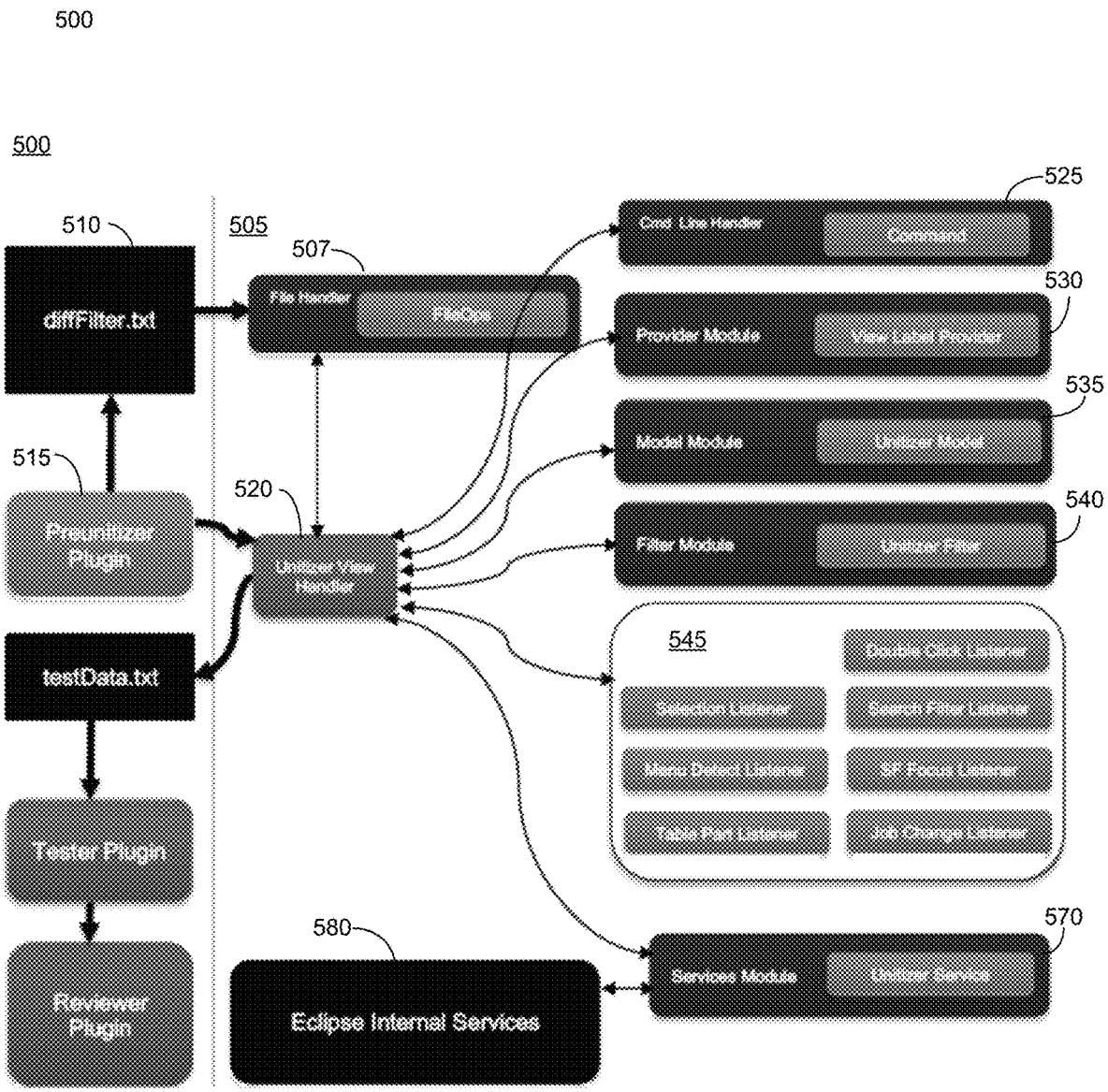
FIG. 5 is an example architecture for a unitizer, according to some embodiments herein.

FIG. 5 is an example architecture 500 for a unitizer plugin 505, according to some embodiments herein. In some aspect, unitizer plugin 505 may be the core or processing center for a unitizer framework herein.

Unitizer plugin 505 may be viewed as the neural center of a unitizer framework herein. Unitizer plugin 505 may be tasked with determining the test cases that have been affected by the code changes made by a user, as well as providing the result to the user for further manipulation and transmitting the same information onto other successive plugins and processing components.

Unitizer plugin 505 includes a plurality of modules whose actions may be governed by the Unitizer View Handler (UVH) 520. In some embodiments, unitizer plugin 505 may be an Eclipse View with the ability to perform its primary task of determining the affected test cases (e.g., JUnits). Eclipse Internal Services 580 may be considered to be a "black box" with respect to the architecture herein, where the inner working details therein are not a focus herein.

UVH 520 is the processing center of unitizer plugin 505 that manages the information to be displayed, as well as being responsible for triggering a determination of the affected test cases. UVH 520 receives information via a Provider Module (PM) 530, to populate a table to display to the user. A Model Module (PM) 535 is used to record necessary data to be displayed, depending on the particular unitizer being implemented. UVH 520 may filter the affected test case results as specified by instructions received from File Handler module (FM) 507. FM 507 reads the file including a description of the code change differences (e.g., "diffFilter.txt") and creates a map or other data structure representation of the modified files and the associated modified methods. FM 507 sends this information to UVH 520. UVH 520 receives an input of the modified methods from a Files Handler (FM) 507.

UVH 520 allows the user to navigate to a particular one or more of the affected test case(s) based on instructions received from a Listeners Module (LM) 545. LM 545 monitors and detects user interactions with unitizer plugin 505 via a UI (not shown in FIG. 5). LM 545 provides event listeners for actions to be performed on the results displayed. In general, LM 545 may listen to, for example, two types of UI events or actions provided by a user, including a double-click event and a right-click event. A detected double-click by a user on an entry in the results table of a Unitizer View might cause the user to be taken to the test method that is calling the modified method. In response to a detected right-click event on a Unitizer View, different actions may be invoked, including but not limited to: viewing the modified method, viewing the affected test method, running the affected test method, running all the affected tests methods, attaching the results to the crucible review, exporting the results (e.g., as a ".csv" file), and other options.

An identification task may be triggered by initiating a Services Module (SM) 570. Service Module (SM) operates to compute the affected test cases based on the information provided by the data passed by UVH 520 and may return it back to UVH for further processing and displaying. SM 570 relies on functionalities exposed by the IDE's (e.g., Eclipse's) Internal Services 580. SM 570 may use a DFS technique with backtracking to determine direct and indirect affections. An affection herein is defined as a relationship between a modified method and a corresponding test case method. A direct affection means that the modified method is directly called by a test method and may also be referred to as the zeroeth indirect affection. An indirect affection means that the modified method is called by another method which is, in turn, called by a test case method. This scenario is referred to as the first indirect affection. A second indirect affection relates to the scenario where the modified method is called by a method which is called by another method, which in turn is called by a test case method. The levels of indirect affection can be set by the user. The higher the number of indirect levels, the larger the computation time required.

Provider Module (PM) 530 provides the UVH with the correct data format that will be displayed in a result table and Model Module (MM) 535 provides the basic structure of how the information is to be stored and utilized by UVH 520 and PM 530. Filter Module (FiM) 540 provides the filtration criteria for the results displayed, allowing the user to narrow down on specific modified methods, if required.

Figure 6:
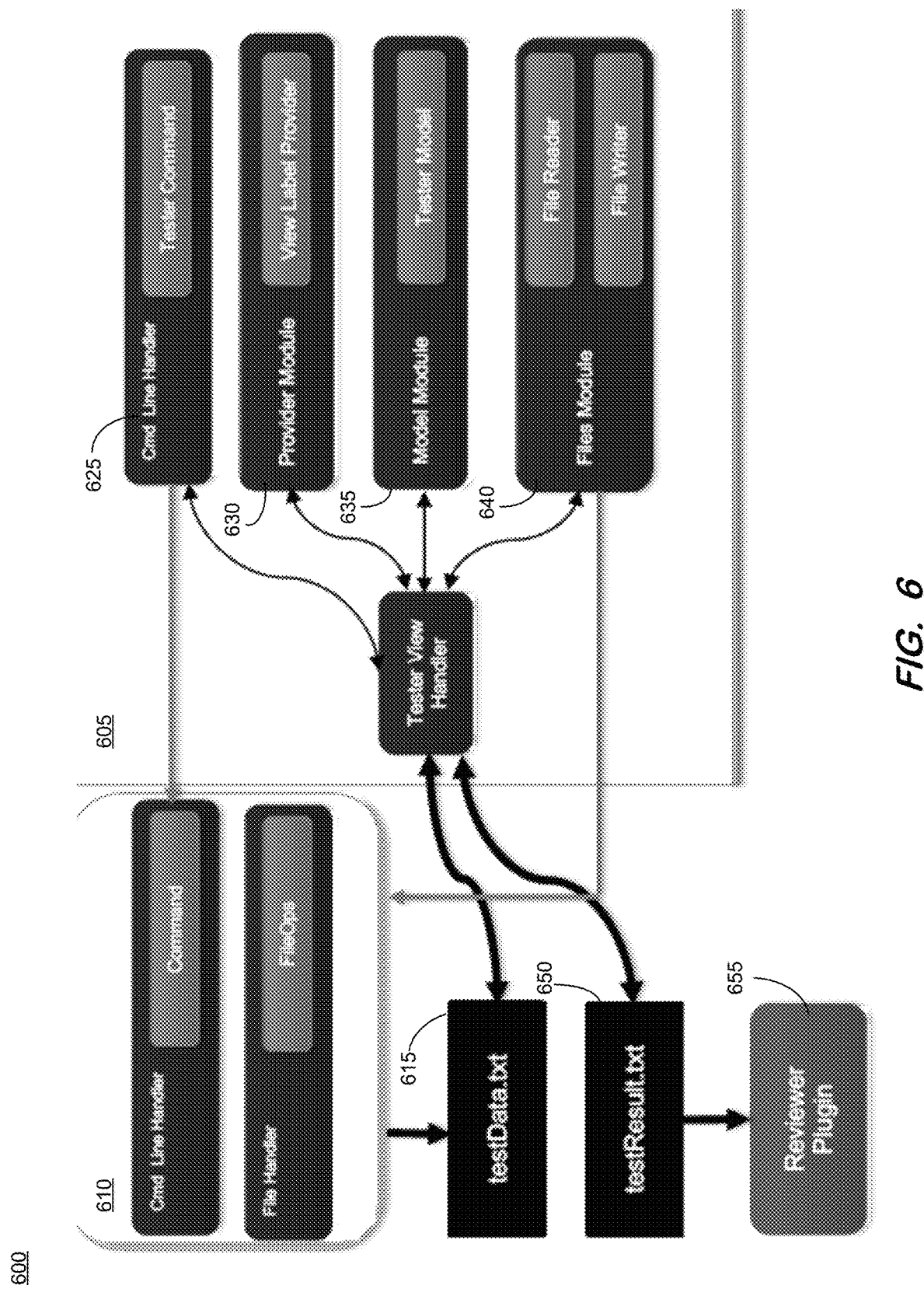
FIG. 6 is an example architecture for a tester, according to some embodiments herein.

FIG. 6 is an example architecture 600 pertaining to a tester plugin, according to some embodiments herein. Tester plugin 605 is responsible for running or executing the directly and indirectly affected test cases and providing the compiled results to a user. Tester plugin 605 further generates a report (e.g., a text-based) 650 that can be made available when the tester plugin transfers the flow of control to a successive Reviewer plugin (e.g. 655).

Tester View Handler (TVH) 620 is a view handler for handling testing related tasks of a unitizer framework herein. TVH 620 has access to the various modules to trigger different actions, as well as to receive data and formats for the data and display the same to a user and export the results to Reviewer plugin 655 via a file 650 (e.g., "testResult.txt").

Command Line Module (CLM) 625 is responsible for providing an interface between a command line terminal and TVH 620 to execute the test cases and return the results. CLM 625 extends the Command class of the Unitizer plugin 610.

A Provider Module (PM) 630 is responsible for providing a View Label to the TVH 620 to provide the result data in a desired formatted manner. Model Module (MM) 635 is responsible for providing a model for storing the results obtained from the execution commands in CLM 625. Additionally, Files Module (FM) 640 is responsible for providing file reading and file writing functionalities abilities to TVH 620 to enable the TVH to extract information from the "testData.txt" file and write information to the, for example, "testResult.txt" file.

Figure 7:
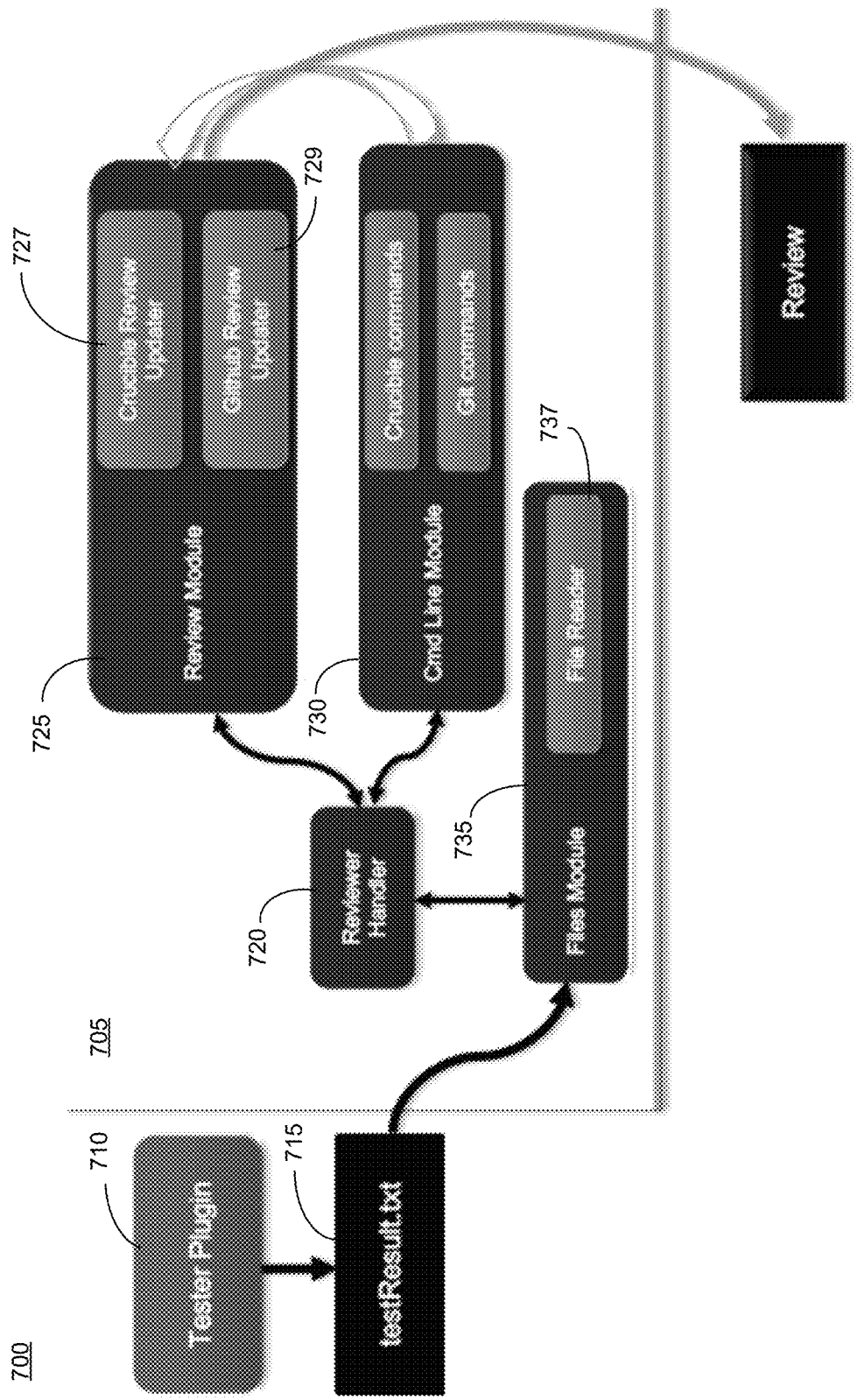
FIG. 7 is an example architecture for a reviewer, according to some embodiments herein.

FIG. 7 is an example architecture 700 for a Reviewer plugin 705, according to some embodiments herein. Reviewer plugin 705 is responsible for receiving the test results from a tester plugin 710, translating them into a format that may be appended to the description of a changelist, and uploaded to a review report or in response to an application pull request.

Reviewer Handler 720 is a plugin handler responsible for triggering actions from a Files module 735, Command Line module 730, and Review module 725. Review Handler 720 might not have an intelligence of its own, but instead may be responsible for the coordination between the modules 725, 730, and 735 and ensuring that data flows therebetween seamlessly.

Files Module 735 is responsible for interacting with files. In particular, Files Module 735 contains a File Reader 737 to read the results from a file (e.g., "testResult.txt") and pass it onto Review module 725 via Reviewer Handler 720.

Review Module 725 is responsible for adding the test results to the appropriate review areas, per a technology environment (e.g., Crucible Review Updater 727 and Github Review Updater 729). Reviewer Handler 725 is responsible for deciding which review updater 727 and 729 to select. The review updaters 727, 729 depend on their corresponding component in Command Line Module 730 to generate and run the actual update action via the command line. Review Module 720 also provides the user with the result of the update of the review.

Command Line Module 730 is responsible for generating the appropriate terminal command to handle the updation task and return the result of an update run to the review updaters 727 and 729 to apprise the user of the status.

Figure 8:
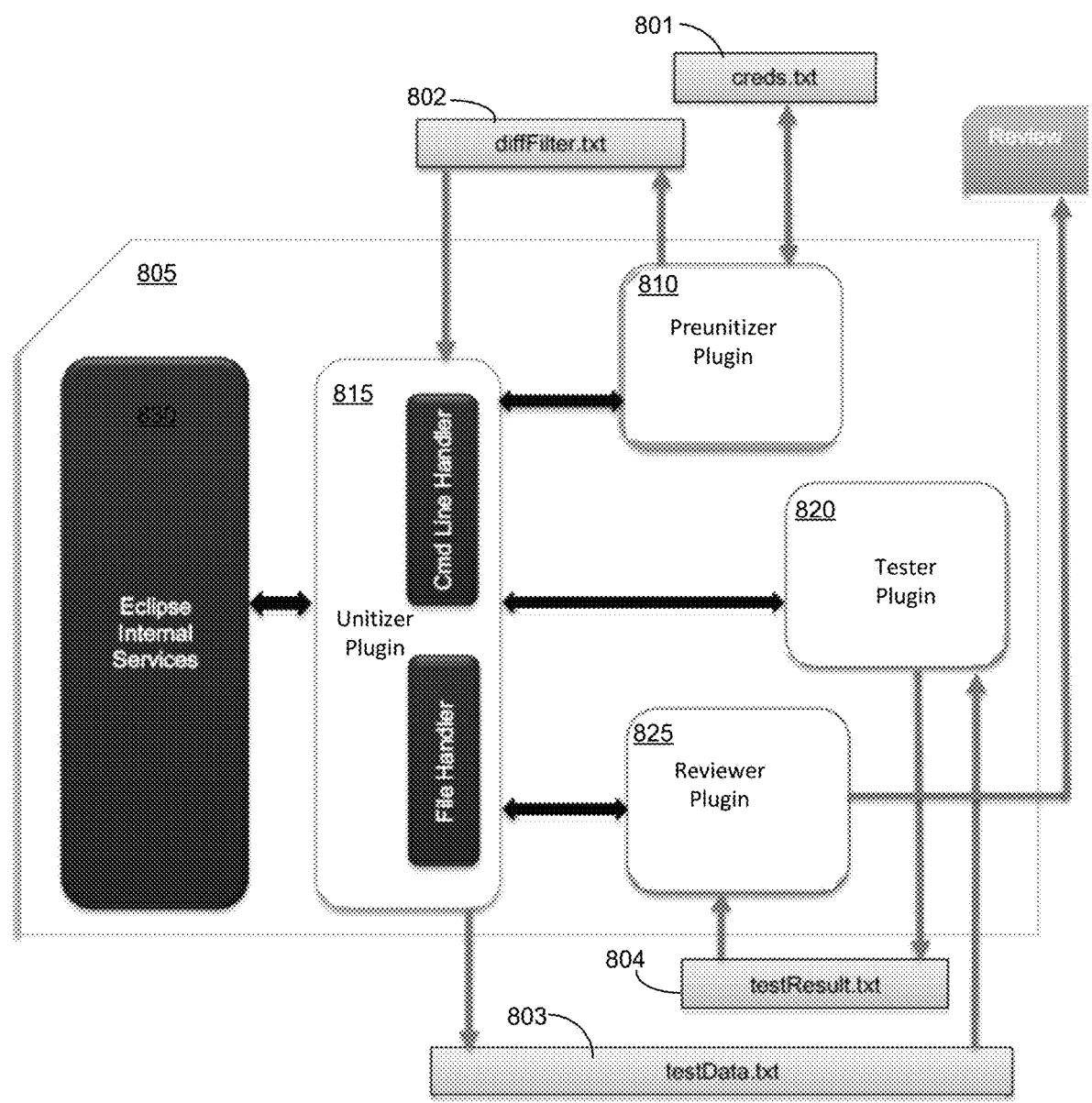
FIG. 8 is an example overall schematic architecture for a unitizer framework, according to some embodiments herein.

FIG. 8 is an example of a high-level overall schematic architecture 800 for a unitizer framework 805, according to some embodiments herein. The details of Preunitizer plugin 810, Unitizer plugin 815, Tester plugin 820, and Reviewer plugin 825 are disclosed hereinabove and are not repeated again here. FIG. 8 illustrates an example of a logical configuration for the functional aspects of a unitizer framework herein and how the different plugins therein interact with each other within the framework. Consistent with other architectures depicted herein, the double-headed arrows indicate bi-directional information and operation flows while the single-headed arrows depict unidirectional information flows. Furthermore, FIG. 8 includes the various inputs and outputs discussed elsewhere herein, including files 801, 802, 803, and 804.

Figure 9:
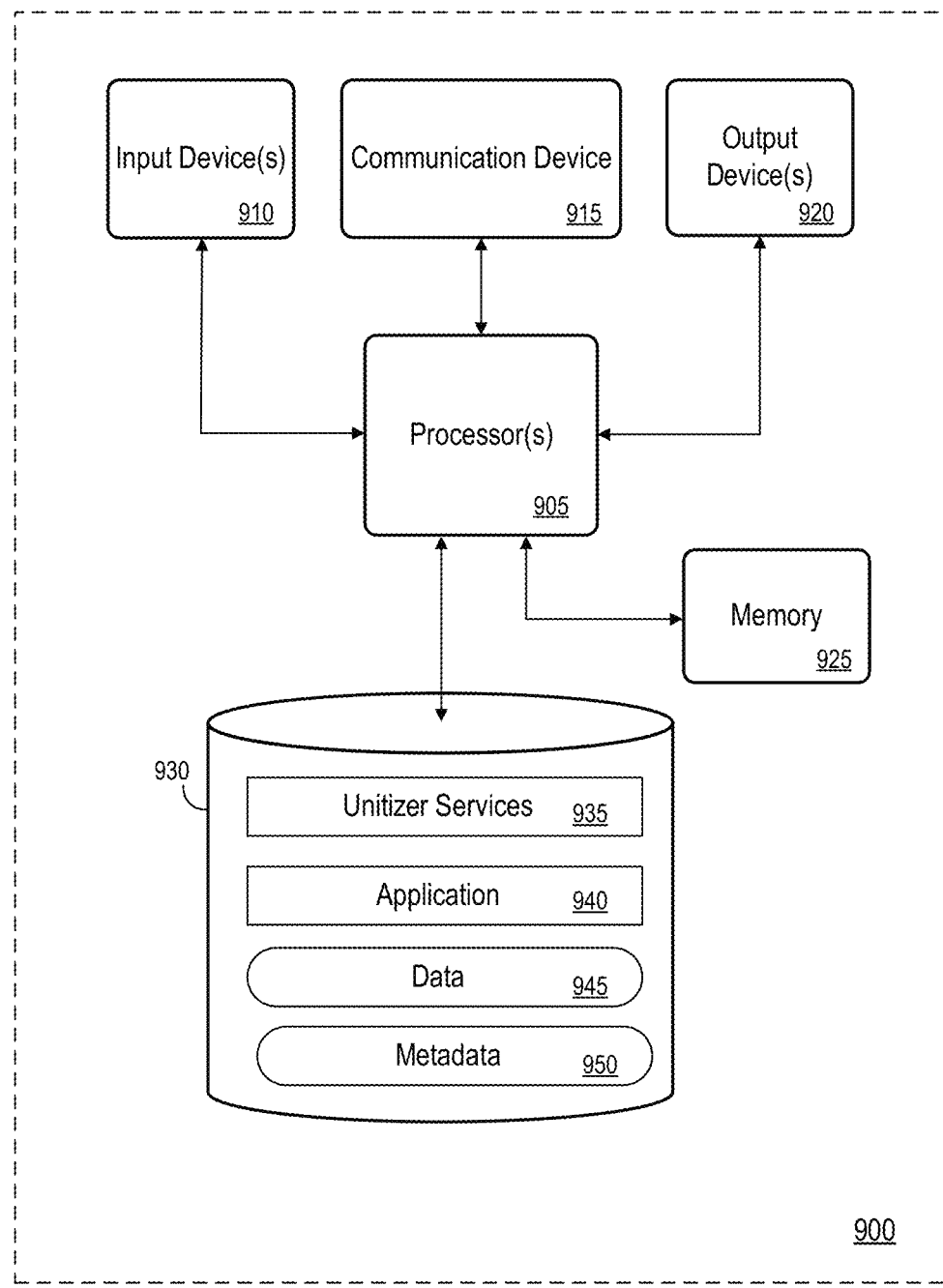
FIG. 9 is a block diagram of an apparatus, according to some embodiments.

FIG. 9 is a block diagram of apparatus 900 according to some embodiments. Apparatus 900 may comprise a computing apparatus and may execute program code to perform any of the functions described herein, including one or more of the processes and plugins disclosed in FIGS. 1-8. Apparatus 900 may include other unshown elements according to some embodiments.

Apparatus 900 includes processor 905 operatively coupled to communication device 920, data storage device 930, one or more input devices 910, one or more output devices 920 and memory 925. Communication device 915 may facilitate communication with external devices, such as a reporting client, or a data storage device. Input device(s) 910 may comprise, for example, a keyboard, a keypad, a mouse or other pointing device, a microphone, knob or a switch, an infra-red (IR) port, a docking station, and/or a touch screen. Input device(s) 910 may be used, for example, to enter information into apparatus 900. Output device(s) 920 may comprise, for example, a display (e.g., a display screen) a speaker, and/or a printer.

Data storage device 930 may comprise any appropriate persistent storage device, including combinations of magnetic storage devices (e.g., magnetic tape, hard disk drives and flash memory), optical storage devices, Read Only Memory (ROM) devices, etc., while memory 925 may comprise Random Access Memory (RAM), Storage Class Memory (SCM) or any other fast-access memory.

Unitizer services 935 and application 940 may comprise program code executed by processor 905 to cause apparatus 900 to perform any one or more of the processes described herein (e.g., process 100 of FIG. 1, as well as any of the functions of the various individual plugins disclosed herein). Embodiments are not limited to execution of these processes by a single apparatus.

Data 945 (e.g., a code base) and metadata 950 (either cached or a full database) may be stored in volatile memory such as memory 925. Metadata 950 may include information regarding code change files. Data storage device 930 may also store data and other program code and instructions for providing additional functionality and/or which are necessary for operation of apparatus 900, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable instructions; and
a processor to execute the processor-executable instructions, within an integrated development environment (IDE) application, to cause the system to:
identify, by a first plug-in to the IDE application, code changes to a set of computer-executable code, the first plug-in generating a first file including an indication of the identified code changes;
determine, by a second plug-in to the IDE application in response to receiving the first file from the first plug-in, one or more unit tests of computer-executable code corresponding to the identified code changes indicated in the first file, based on a determination of both direct affections and indirect affections between the identified code changes and the one or more unit tests of computer-executable code, the direct affections indicative of a computer-executable code change that is directly called by a test unit and the indirect affections indicative of a computer-executable code change that is called by at least one other computer-executable code method that is itself called by a test unit, the second plug-in generating a second file including an indication of the determined one or more unit tests of computer-executable code corresponding to the identified code changes;
execute, by a third plug-in to the IDE application in response to receiving the second file from the second plug-in, the determined one or more unit tests of computer-executable code indicated in the second file corresponding to the identified code changes indicated in the first file, the execution of the one or more unit tests of computer-executable code being done in isolation from other computer-executable code for which the one or more unit tests of computer-executable code are developed to interface with, the third plug-in generating a third file including an indication of test results for the executed one or more unit tests of computer-executable code;
translate, by a fourth plug-in to the IDE application in response to receiving the third file from the third plug-in, the test results for the executed one or more unit tests of computer-executable code indicated in the third file into another format; and
export, by the fourth plug-in, the translated test results and an indication of the corresponding test units of computer-executable code to a reporting entity.

2. The system of claim 1, wherein the processor further executes the processor-executable instructions, within the integrated development environment application, to cause the system to:
access a repository storing the set of code.

3. The system of claim 1, wherein the set of computer-executable code comprises a software application program.

4. The system of claim 1, wherein the processor further executes the processor-executable instructions, within the integrated development environment application, to cause the system to:
append, by the fourth plug-in, the generated test results to a listing of the identified code changes covered by the executed one or more unit tests of computer-executable code, wherein the generated test results exported to the reporting entity includes the listing of the determined computer-executable code changes covered by the executed one or more unit tests of computer-executable code.

5. The system of claim 1, wherein the processor further executes the processor-executable instructions, within the integrated development environment application, to cause the system to:
detect, by the second plug-in via a user interface, user action events related to at least one of a viewing of the computer-executable code changes, a viewing of the one or more unit tests of computer-executable code corresponding to the identified code changes, an execution of the one or more unit tests of computer-executable code corresponding to the identified code changes, the generating of the test results, and the exporting of the generated test results; and
receive, via the user interface, an indication of filter criteria from the user.

6. A computer-implemented method, executed within an integrated development environment application, the method comprising:
identifying, by a first plug-in to the IDE application, code changes to a set of computer-executable code, the first plug-in generating a first file including an indication of the identified code changes;
determining, by a second plug-in to the IDE application in response to receiving the first file from the first plug-in, one or more unit tests of computer-executable code corresponding to the identified code changes indicated in the first file, based on a determination of both direct affections and indirect affections between the identified code changes and the one or more unit tests of computer-executable code, the direct affections indicative of a computer-executable code change that is directly called by a test unit and the indirect indicative of a computer-executable code change that is called by at least one other computer-executable code method that is itself called by a test unit, the second plug-in generating a second file including an indication of the determined one or more unit tests of computer-executable code corresponding to the identified code changes;

executing, by a third plug-in to the IDE application in response to receiving the second file from the second plug-in, the determined one or more unit tests of computer-executable code indicated in the second file corresponding to the identified code changes indicated in the first file, the execution of the one or more unit tests of computer-executable code being done in isolation from other computer-executable code for which the one or more unit tests of computer-executable code are developed to interface with, the third plug-in generating a third file including an indication of test results for the executed one or more unit tests of computer-executable code;

translating, by a fourth plug-in to the IDE application in response to receiving the third file from the third plug-in, the test results for the executed one or more unit tests of computer-executable code indicated in the third file into another format; and exporting, by the fourth plug-in, the translated test results and an indication the corresponding test units of computer-executable code to a reporting entity.

7. The method of claim 6, further comprising, within the integrated development environment application, accessing a repository storing the set of code.

8. The method of claim 6, wherein the set of code comprises a software application program.

9. The method of claim 6, further comprising, within the integrated development environment application, appending, by the fourth plug-in, the generated test results to a listing of the determined code changes covered by the executed one or more unit tests, wherein the generated test results exported to the reporting entity includes the listing of the determined code changes covered by the executed one or more unit tests.

10. The method of claim 6, further comprising, within the integrated development environment application:

detecting, by the second plug-in via a user interface, user action events related to at least one of a viewing of the code changes, a viewing of the one or more unit tests corresponding to the identified code changes, an execution of the one or more unit tests corresponding to the identified code changes, the generating of the test results, and the exporting of the generated test results; and receiving, via the user interface, an indication of filter criteria from the user.

11. A non-transitory computer readable medium having executable instructions stored therein, the medium comprising instructions to, within an integrated development environment application:

identify, by a first plug-in to the IDE application, code changes to a set of computer-executable code, the first plug-in generating a first file including an indication of the identified code changes;

determine, by a second plug-in to the IDE application in response to receiving the first file from the first plug-in, one or more unit tests of computer-executable code corresponding to the identified code changes indicated in the first file, based on a determination of both direct affections and indirect affections between the identified code changes and the one or more unit tests of computer-executable code, the direct affections indicative of a computer-executable code change that is directly called by a test unit and the indirect indicative of a computer-executable code change that is called by at least one other computer-executable code method that is itself called by a test unit, the second plug-in generating a second file including an indication of the determined one or more unit tests of computer-executable code corresponding to the identified code changes;

execute, by a third plug-in to the IDE application in response to receiving the second file from the second plug-in, the determined one or more unit tests of computer-executable code indicated in the second file corresponding to the identified code changes indicated in the first file, the execution of the one or more unit tests of computer-executable code being done in isolation from other computer-executable code for which the one or more unit tests of computer-executable code are developed to interface with, the third plug-in generating a third file including an indication of test results for the executed one or more unit tests of computer-executable code;

translate, by a fourth plug-in to the IDE application in response to receiving the third file from the third plug-in, the test results for the executed one or more unit tests of computer-executable code indicated in the third file into another format; and export, by the fourth plug-in, the translated test results and an indication the corresponding test units of computer-executable code to a reporting entity.

12. The medium of claim 11, further comprising instructions to, within the integrated development environment application, access a repository storing the set of code.

13. The medium of claim 11, wherein the set of code comprises a software application program.

14. The medium of claim 11, further comprising instructions to, within the integrated development environment application, append, by the fourth plug-in, the generated test results to a listing of the determined code changes covered by the executed one or more unit tests, wherein the generated test results exported to the reporting entity includes the listing of the determined code changes covered by the executed one or more unit tests.

15. The medium of claim 11, further comprising instructions to, within the integrated development environment application:

detect, by the second plug-in via a user interface, user action events related to at least one of a viewing of the code changes, a viewing of the one or more unit tests corresponding to the identified code changes, an execution of the one or more unit tests corresponding to the identified code changes, the generating of the test results, and the exporting of the generated test results; and receive, via the user interface, an indication of filter criteria from the user.

* * * * *